Fig. 1ᵃ

July 10, 1934.   C. FLETCHER   1,965,743
HACK SAW MACHINE
Filed Sept. 8, 1930    4 Sheets-Sheet 4

Inventor:
Charles Fletcher.
By his Attorney:- Walter Gunn.

Patented July 10, 1934

1,965,743

UNITED STATES PATENT OFFICE 1,965,743

HACK SAW MACHINE

Charles Fletcher, Cheadle Hulme, England; Sedgley Fletcher, Charles Norman Fletcher, and Sedgley Bernice Fletcher, executors of said Charles Fletcher, deceased Application September 8, 1930, Serial No. 480,366 In Great Britain September 17, 1929

2 Claims. (Cl. 29—73)

This invention relates to hack saw machines.

Metal sawing machines are of various types, including circular saw machines and reciprocating or hack saw machines. Owing to various improvements and developments the latest models of the circular saw machines are now capable of much larger output than are the latest models of the hack saw machines. On the other hand, the hack saw machine is comparatively cheaper and for some other reasons is still to be preferred to the circular saw machine.

The object of the invention is an improved construction of hack saw machine having an improved output capacity and efficiency.

According to one feature of the invention, the saw is rigidly secured at its ends in a frame without tension and is supported intermediately of its length.

According to another feature of the invention the saw may be built up, that is to say, comprising in combination a blade of ordinary width and a supporting plate, which supporting plate may also provide lateral rigidity for the blade, and inserted teeth may be used in the saw. Another feature of the invention is to construct the saw frame so that it may form a clamp for the saw. The invention also comprises quick return means for the feed mechanism and lift motion for the saw in operation.

Upon the accompanying drawings:—

Figs. 1 and 1a constitute a side elevation of one example of hack saw machine embodying the several features of the invention.

Fig. 2 is a front elevation of part of the machine shown in Figs. 1 and 1a.

Figure 1:
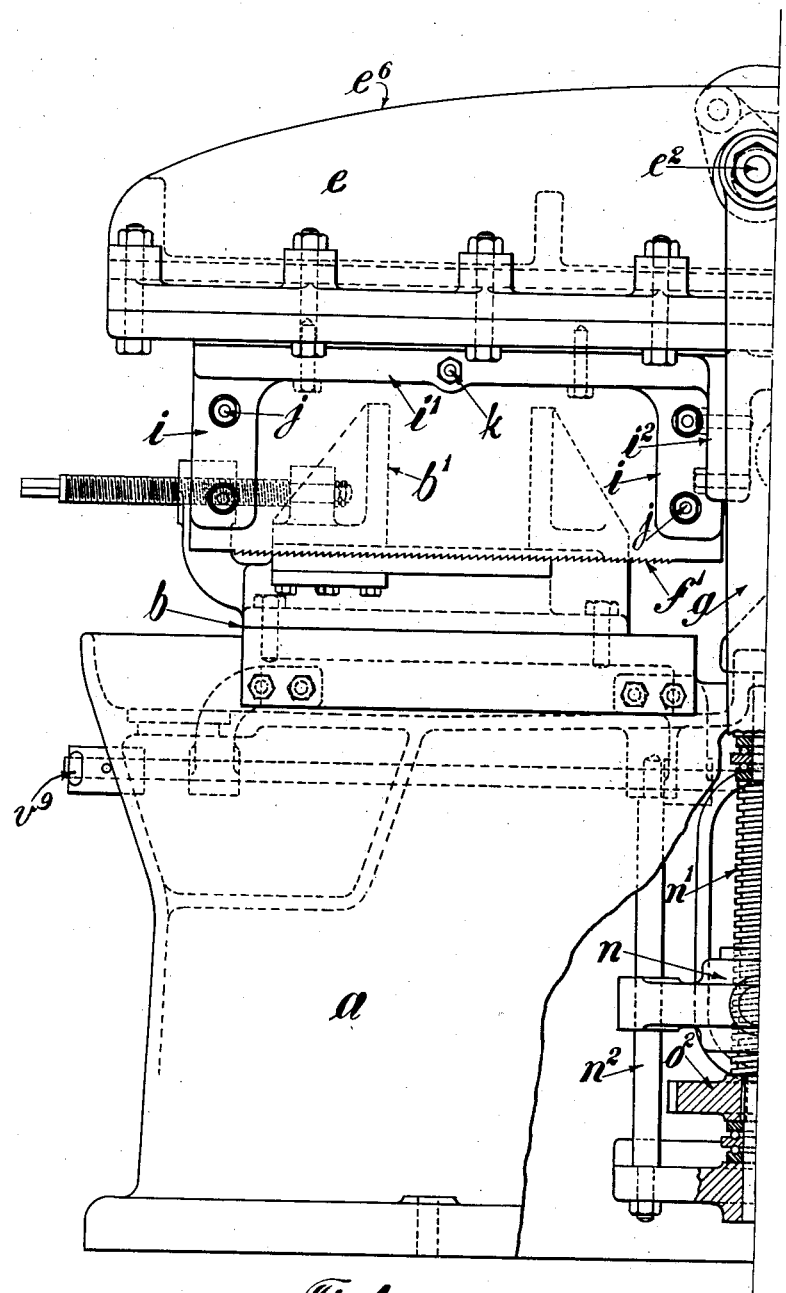

As illustrated, the improved hack saw machine comprises a rectangular base $a$ on the top of which is the sawing table $b$ and vices $b^1$ for holding the work on each side of the cut to be made, one only of such vices being shown in the drawings. At the back end of the table are upstanding brackets $c$, arranged at each side and supporting the crank-shaft $d$ for driving the saw. Also pivoted between the brackets is an arm $e$ overhanging the table and having two grooves $e^1$ constituting a slide for the saw frame $f$ in which the saw $f^1$ is carried, the arm being supported by links $g$ which also apply the feed or cut to the saw, such links being disposed on each side of the arm and at about the centre of its length. The saw frame $f$ is connected by a connecting rod $h$ to the crank of the crank-shaft $d$. At their upper ends the links $g$ are mounted on the eccentric ends of a spindle $e^2$ journaled in the arm $e$ and connected by links $e^3$ and $e^4$ to the rear end of the saw arm $e$. A link $e^5$ is connected to the common pivot of the links $e^3$ and $e^4$ and to the lug $h^1$ on the connecting rod $h$. The eccentric for lifting the saw arm may be arranged at the other end of the links $g$, with suitable modified actuating mechanism. The pivots for the arm $e$ may be concentric with the bearings of the crank-shaft, or above the crank-shaft as illustrated so as to enable the width of the machine from back to front to be as small as possible. The arm $e$ is of U-shaped cross section having two longitudinal webs $e^6$, one at each side, of varying depth, which extend at the rear end to form pivot lugs. On the underside of the arm are depending extensions $e^7$ to which are bolted retaining slides $e^8$ for the saw frame.

The saw frame $f$, which is connected by the connecting rod $h$ to the crank of the crank-shaft $d$, comprises a slide part, having on its upper side two V-shaped slide portions $f^2$ to engage the corresponding slide grooves $e^1$, through which slide portions the pressure is applied to the saw for the cut. On the underside, along each edge, the slide has two flat slide surfaces engaging the retaining slide plates $e^8$ and on which the saw frame is lifted with the arm. To the underside of this slide part are bolted two arms $i$ by long upper flanges $i^1$ between which the saw $f^1$ is to be secured, which arms are arched to expose the centre or working portion of the saw. The ends of the arms may be strengthened by flanges $i^2$ which will merge into the upper flange $i^1$. The back edge of the saw $f^1$ lies against the slide part so that it is directly supported thereby for the whole of its length, and for clamping the saw between the arms, bolts $j$ are provided in the arms of the frame by which the two arms can be clamped together to grip the saw. The clamping bolts preferably pass through the saw so that it is bolted to the frame. A clamping screw $k$ is also provided centrally in the upper flanges $i^1$. Brackets $m$ for a pivot pin for the connecting rod $h$, are secured to the rear flanges of the frame by bolts as shown, or these may be cast in one piece with the frame.

Within the base of the machine is the feed mechanism comprising a carriage $n$ carrying a nut mounted on a feed screw $n^1$ and guide rod $n^2$ one only of which is shown. The driving mechanism, which may be provided as an independent unit fitted into the base, comprises a vertical countershaft $o$ behind the feed screw $n^1$, geared thereto at its lower end by pinions $o^1$, $o^2$, and provided with a bevel wheel $o^3$ at its upper end. A horizontal feed driving shaft $p$ is provided, journaled in the frame of the feed unit and having a bevel wheel $p^1$ to engage with the bevel wheel $o^3$ on the vertical shaft. On the end of the horizontal shaft is keyed a sliding clutch adapted to engage alternatively with counterpart clutches journaled on the shaft, the inner one of which is adapted to be driven at a relatively high speed by a chain $q$ from the main driving shaft $r$ through a counter-shaft $q^1$, so as to provide a quick return or lift for the saw. The outer clutch counter-part is driven by pawl mechanism from the crank-shaft $d$, the circumference of the clutch being provided with ratchet teeth $s$. The pawl mechanism comprises an arm $s^1$ rotatably journaled on the end of the horizontal shaft, carrying a pawl $s^2$, the outer end of the arm being connected to one end of a link $s^3$. In place of the toothed ratchet the known friction band type of ratchet may be used which will obviously give intermediate rates of feed and is quieter. The other end of the link $s^3$ is connected to a pivot $s^4$ on a slide block $s^5$ adjustably positioned in a diametrical slot in a wheel $s^6$ fixed on the end of the crank-shaft $d$. The throw of the pawl mechanism is therefore adjustable by adjustment of the position of the slide block $s^5$ in its slot. Over the sliding clutch is arranged an operating fork $t$ having a short arm $t^1$ extending from the pivot towards the base of the machine. In the end of such arm is positioned a plunger $t^2$ with wedge-shaped outer end, and behind which is positioned a short compression spring $t^3$. Immediately opposite to such plunger is a similar shaped stud $u$ in the end of a lever $u^1$ pivoted in a bracket, and connected at its other end to a rod $u^2$ the other end of the rod being connected by a knuckle joint to a further rod $u^3$ passing through a lug $u^4$ on the side of the saw arm, and provided with adjustable stops $u^5$ to engage such lug.

The arm $t$ which controls the clutch for the lift or feed of the saw arm, is connected to catch mechanism which releases the belt striking gear and so stops the machine entirely at the moment the saw arm has been lifted to the predetermined distance.

Figure 3:
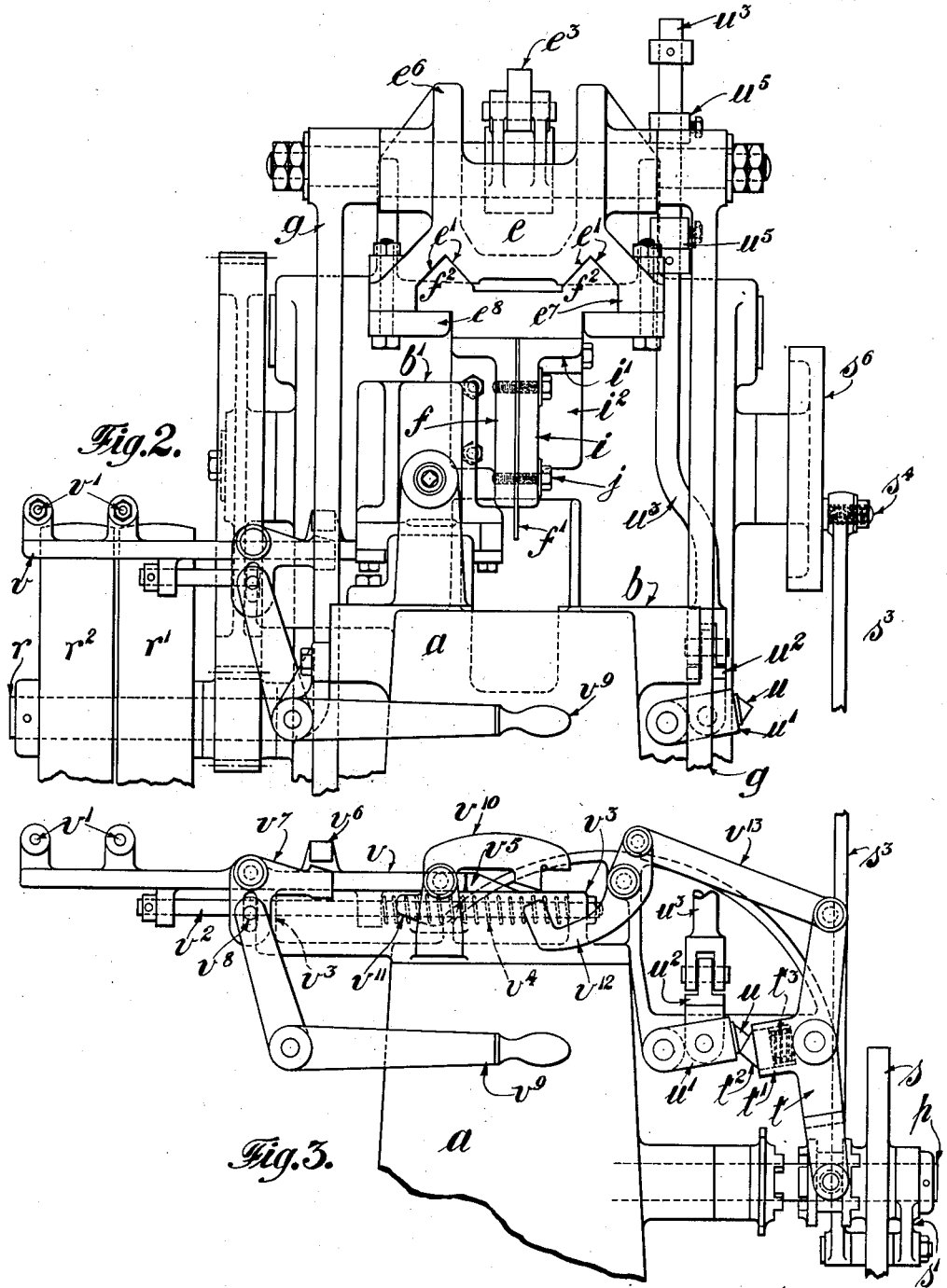
Fig. 3 is a detail of the automatic knock off mechanism.

This catch mechanism (see Fig. 3) comprises a sliding bar $v$ carrying the belt changing forks $v^1$ and mounted on a guide rod $v^2$ supported by brackets $v^3$ secured to the base $a$. A spring $v^4$ is provided on the rod $v^2$ to return the bar to the "off" position and carry the driving belt on to the loose pulley $r^2$. One of the brackets $v^3$ extends beyond the base. On the side of the bar $v$ is formed a wedge-shaped catch piece $v^5$. The brackets themselves are also formed to support the sliding bar $v$ horizontally above its guide rod $v^2$. Formed on the sliding bar $v$ is a stop lug $v^6$ overhanging the side of the bar, and pivoted to the bar is a cranked trip lever $v^7$, one end of which engages beneath the lug $v^6$. The other and depending end of the cranked trip lever is slotted and is engaged by a pin $v^8$ on one arm of the starting lever $v^9$. Above the sliding bar $v$ is pivoted a catch $v^{10}$ adapted to engage the catch piece $v^5$ and having an extension $v^{11}$ adapted to be engaged by the end of the trip lever $v^7$. Pivoted on the frame is a combined catch and trip lever $v^{12}$ adapted to engage and lift the catch portion of the catch $v^{10}$ and also to engage behind the catch $v^5$. When the lever $v^{12}$ has lifted the catch $v^{10}$, the bar $v$ moves slightly until caught by the end of the lever $v^{12}$, engaging the catch piece $v^5$ so that the catch $v^{10}$ cannot re-engage when the end of the lever $v^{12}$ is withdrawn.

In operation, by depressing the starting handle the bar $v$ is caused to slide and by its belt changing forks $v^1$ starts the machine. When the bar has been moved to its extreme position the catch $v^{10}$ engages behind the catch piece $v^5$ and holds the bar against the returning action of the spring $v^4$. The clutch-operating fork $t$ and its coacting parts are then in the position shown in Fig. 3 and the ratchet feed mechanism is in operation. When the saw reaches the bottom of its cut, the rod $u^3$ is depressed by the engagement of the lug $u^4$ against the lower adjustable stop $u^5$ thereon. The downward movement of the rod $u^3$ depresses the lever $u^1$ and presses back the plunger $t^2$ against its spring $t^3$. This movement continues until the stud $u$ on the end of the lever $u^1$ passes over the end of the plunger $t^2$, when, by reason of the spring $t^3$, the plunger $t^2$ slides up the upper face of the stud $u$ and causes the operating fork $t$ to move across to engage the saw lifting drive. With such action the lever $v^{12}$ is moved so as to trip the catch lever $v^{10}$, and itself engages the catch piece $v^5$. The saw is quickly raised by the chain drive until the upper stop $u^5$ engages and lifts the rod $u^3$, moving the lever $u^1$ until the stud $u$ passes over the end of the plunger $t^2$ and the plunger then sliding on the lower face of the stud $u$ causes the fork $t$ to be thrown over to the first position as illustrated, engaging the ratchet feed drive clutch and withdrawing the catch of the lever $v^{12}$ when the spring $v^4$ returns the belt fork to the "off" position and all the parts are again in the position shown in Fig. 3. The catch $v^{10}$ may be released by means of the handle $v^9$ by raising the latter, the initial movement of which causes the trip lever $v^7$ to depress the end $v^{11}$ of the lever $v^{10}$.

On the end of the crank-shaft $d$ is a gear wheel $d^1$, meshing with a gear wheel $d^2$ on the shaft $q^1$ on the end of which shaft is also a gear wheel $d^3$ meshing with a gear wheel $d^4$ on the driving shaft $r$ on which latter shaft are provided fast and loose pulleys $r^1$ and $r^2$ respectively. A pump $r^3$ for the cutting lubricant is provided in the base of the machine, and is driven by a suitable belt $r^4$ from the main driving shaft $r$.

In a modification, the saw frame arm may be supported on a slide, instead of being pivoted and the saw may be vertical instead of horizontal.

The machine will preferably be made with the base in one casting so as to obtain rigidity.

The divided construction of the saw frame $f$ allows the saw $f^1$ to be inserted from the end or from one side and its rigid construction and the secure fastening of the saw render it so much a part of the frame as to allow of heavy pressures and work without spring or vibration.

Figure 2:
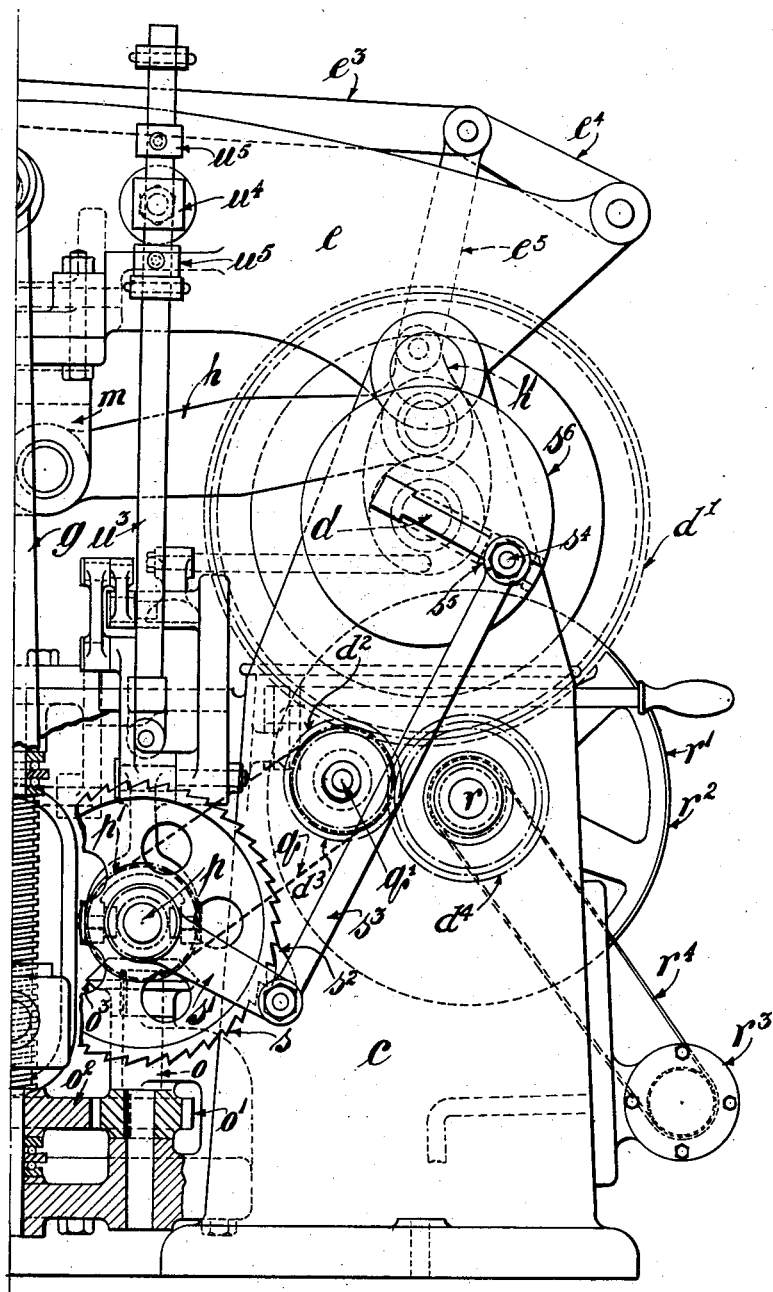
Figure 4:
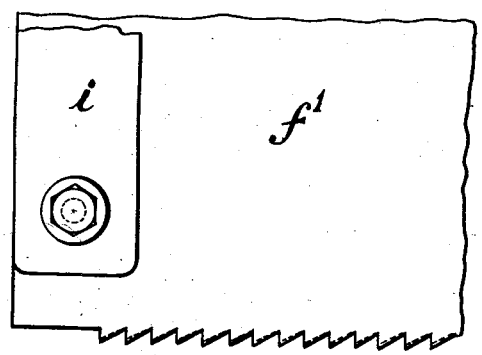
Figs. 4 and 5 show details of one end of the saw blade to a larger scale.
Figure 5:
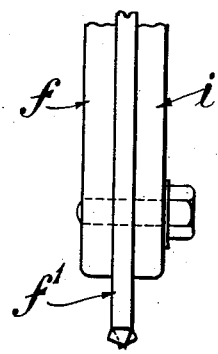

Figs. 4 and 5 show the saw as fitted in the machine shown in Figs. 1, 1a and 2.

What I claim is:—

1. In a hack saw machine, a screw feed and lifting mechanism for the saw, comprising connecting links between the saw frame and the screw feed mechanism and an eccentric forming one pivot of the links, as set forth.

2. In a hack saw machine, a screw feed and lifting mechanism for the saw comprising connecting links between the saw frame and the screw feed mechanism, an eccentric forming one pivot of the links, a crank shaft and connecting rod for driving the saw frame and link mechanism connecting the eccentric to the said crank, as set forth.

CHAS. FLETCHER.